United States Patent [19]

Althouse et al.

[11] 3,847,654
[45] Nov. 12, 1974

[54] SUBSTRATE BONDED WITH VINYL DISPERSION TEXTURED COATING

[75] Inventors: Harlan E. Althouse, Pontiac; Fremont L. Scott, Birmingham, both of Mich.; Gordon E. Cole, Jr., Greenwich, Conn.

[73] Assignee: M & T Chemicals Inc., New York, N.Y.

[22] Filed: Sept. 22, 1972

[21] Appl. No.: 291,387

Related U.S. Application Data

[62] Division of Ser. No. 44,625, June 8, 1970, Pat. No. 3,723,379.

[52] U.S. Cl............. 117/123 D, 117/54, 117/120, 117/126 AB, 117/132 C, 117/148, 117/155 UA
[51] Int. Cl............................................ C03c 25/02
[58] Field of Search......... 117/123 D, 148, 155 UA, 117/161 L, 161 LN, 161 UC, 161 UH, 161 UT, 161 ZB, 47 H, 54, 56, 60, 119.6, 105.3, 126 AB, 132 C, 120; 260/31.8 G, 31.8 M, 31.8 T, 837 PV

[56] References Cited
UNITED STATES PATENTS

| | | | |
|---|---|---|---|
| 2,926,100 | 2/1960 | Weigle et al. | 117/47 X |
| 3,029,159 | 4/1962 | Bliven et al. | 117/119.6 X |
| 3,106,486 | 10/1963 | Harren et al. | 117/123 |
| 3,305,602 | 2/1967 | Brumstead | 260/837 X |
| 3,386,854 | 6/1968 | Sautier | 117/123 |
| 3,418,274 | 12/1968 | Caplan et al. | 260/837 X |
| 3,486,930 | 12/1969 | Autlfinger et al. | 117/155 |
| 3,524,759 | 8/1970 | McConnell et al. | 117/105.3 |
| 3,723,379 | 3/1973 | Althouse et al. | 260/31.8 M |

*Primary Examiner*—Ralph Husack
*Assistant Examiner*—M. R. Lusignan
*Attorney, Agent, or Firm*—Kenneth G. Wheeless; Robert P. Auber

[57] ABSTRACT

In accordance with certain of its aspects, this invention relates to novel compositions and to a process for preparing an article having a textured coating which comprises bonding to a substrate a self-adhering coating composition containing:

(a) 16.0 - 34.2 parts by weight of a first vinyl resin having a relative viscosty of 1.98 - 2.35; a molecular weight of about 75,000 - 101,000, and an average particle size of about 0.5 - 7.0 microns;

(b) 3.8 - 24.0 parts by weight of a second halogen-containing resin having a specific viscosity of about 0.50, an inherent viscosity of about 1.20, a molecular weight average of about 127,000, and a particle size range of at least 7.0 microns to 177 microns;

(c) 1.0 - 7.6 parts by weight of a third vinyl solution resin with reactive sites having a vinyl chloride content of 75.0 to 91.5 percent copolymerized with at least one member selected from the group consisting of vinyl acetate, vinylidene chloride, or an ester of maleic acid, and having an inherent viscosity of about 0.34 - 0.46;

(d) 0.2 - 3.8 parts by weight of a liquid epoxy resin having a viscosity of about 10,000 - 20,000 centipoises and an epoxy equivalent weight of about 180 - 220;

(e) 1.2 - 14.7 parts by weight of an aminoplast resin;

(f) 17 - 30.4 parts by weight of a plasticizer;

(g) about 0.0 - 15.3 parts by weight of a solvent-diluent which when present cooperates with plasticizers to dissolve the third vinyl resins (c), the liquid epoxy resin (d), and the aminoplast resin (e) but does not gel or dissolve either the first vinyl resin (a), or the second halogen-containing resin (b) at temperatures of about 20-35°C.; and wherein the first vinyl resin (a) and the second resin (b) are incompletely soluble in plasticizer (f) at temperatures of 20-35°C. and wherein plasticizer (f) is capable of completely solubilizing the third vinyl resin solution (c);

(h) 3.0 - 23.7 parts by weight of pigments and/or fillers; and, optionally (i) 1.6 - 2.5 parts by weight of at least one polyvinyl chloride stabilizer, wherein the total parts by weight of ingredients (a) - (i) amounts to 100 parts.

8 Claims, No Drawings

SUBSTRATE BONDED WITH VINYL DISPERSION TEXTURED COATING

This application is a divisional application of Ser. No. 44,652, filed June 8, 1970, now U.S. Pat. No. 3,723,379, patented Mar. 27, 1973.

This invention relates to novel compositions and processes including processes for the preparation of new articles and laminates bearing a coherent integrally bonded textured coating. More particularly, this invention relates to novel compositions and to processes for preparing vinyl dispersion textured self-adhering coatings and to the application of said coatings to solid substrates.

Various types of coated materials are known. For example, mixed esters of cellulose have been applied to surfaces and bonded to said surface by means of heat and pressure without the aid of adhesives. Waterproof plaster board has been prepared by waterproofing with bituminous substances such as tar. Decorated wallboard has been prepared by applying a decorative surface of paper bearing a desired pattern protected by a water and oil resistant film of lacquer. Such sheets have been applied to materials such as gypsum board, for example, after the gypsum board has been formed, dried and cut into sheets. Plasticized protein solutions and emulsions have been applied to produce a water-resistant surface which will act as an undercoat for varnish but will, nevertheless, permit the passage of moisture or steam. Hot solutions of plasticized polyvinyl chloride have been used to coat paper with varying degrees of success.

The preparation of a decorative coating on a surface using a single application has usually presented a number of disadvantages such as lack of adhesion, poor bonding strength, or the production of undesirable stresses and strains which result in deformation or splitting during use.

Use of preformed films which are attached to other rigid or pliable supporting substrate may cause problems from the economic standpoint, from the application standpoint, and in versatility and end use. Most, or all, of these free films require use of adhesives to provide adhesion to paper covered gypsum board, involving the use of special equipment for this purpose, or, if applied like wallpaper on the site, require hand cutting, gluing, attaching, etc. In the case of attaching preformed free films to paper covered gypsum boards, there is an added cost of adhesive and of applying it. According to the invention herein, the liquid coating can be shaded to a particular color (other than present standards) and, from the standpoint of scrap production or excess of one color versus another, smaller quantities are involved, and change-over is quicker if one color is superseded by another. The coating of the invention is not in the same category as a paint, as it has certain properties including appearance, resiliency, abrasion resistance, impact resistance, etc. which are beyond those of ordinary paints.

Thus, the development, use of, and application of a coating such as is described herein has certain unique and unusual properties which differ from a paint, enamel, lacquer or post-applied pre-laminated film. The product of the invention may be used for prefinishing of rigid or flexible, semi-rigid substrates which are then oven cured to form a continuous flexible, cohesive, scruff-resistant, highly stain-resistant film. This liquid coating or organosol is applied with a curtain coater, reverse roll coater, knife coater, or spray and when cured in ovens provides a textured finish adhering to the paper or other substrate of wall or gypsum board; these films normally have a range of 3 to 6 mils (0.007–0.015cm) thickness. The product of the invention cannot be brush applied because of resulting texture distortion.

On the other hand, the texture coating of this invention will accept selected compatible latex and solvent-based air dry topcoats if repainting or repair on the site of use is required, without the use of a special primer.

It was found that an air dry, commercial type paint or enamel normally requires, depending upon solids content, several coats to obtain a 3 mil dry film thickness such as is obtained from this invention in a single coating, curing operation as explained above. Furthermore, from a decorative textured appearance it would be difficult to duplicate this with brush or roller application of an air dried coating; this also having been tried with several commercially available air dry coatings with self-texturing additives or post texturing devices or means. Film thickness and texture are both plus qualities in the coating of this invention.

It is recognized in the protective and decorative coatings development and applications field that many heat or other not thermally but catalyzed reactive site cured films have superior and uniquely different properties than can be obtained on air dry coatings. Through application of heat to an applied coating which was formulated to contain heat solvating and/or reactive sites, certain superior performances are effected which are not attainable in air dry coatings. These properties in many cases are superior and different from air dry applications. For instance:

I. A commercially available alkyd air dry flat wall paint was applied to a wall board paper covered substrate and was found to be very much poorer in cohesive properties, direct impact of about 12 in./lbs. causing cracking of the film, whereas under the same conditions the textured coating of the invention herein did not crack. The losses on abrasion evaluation of the alkyd film were three to four times greater as was its texture loss; moisture and stain resistance was also inferior.

II. Another commercially available air dry latex flat wall paint was compared to the coating of the invention and here again inferior hot water and stain resistances were found; poor as well as poorer cohesive and adhesive properties; higher abrasion losses; and loss of stippled texture.

III. A third system of vinyl acetate stipple coat followed by an acrylic finish showed exceptionally inferior abrasion resistance, impact resistance, moisture and stain resistance.

The coating of the invention has adhesion to the face side laminate paper on gypsum board, whereas an ordinary 3 percent opaque pigmented 40 to 60 pph (parts per hundred) plasticizer:homo or co-polymer vinyl resin plastisol also containing solvent did not properly bond and, after cure, films can be easily peeled off. Over this particular substrate the coating of the invention needs no primer, but over some other metallic or non-metallic substrates the use of a primer may provide improved adhesion. The coating of the invention will bond, however, to itself on second coat or multiple coat application and subsequent oven cures.

The coating of the invention has several notable advantages over preformed films which have to be post bonded to the substrates with other bonding adhesive materials and possibly also involving additional mechanical procedures and equipment. Being a liquid coating with built in adhesive promoting components, it needs no primer when used on paper covered gypsum board substrates, thus eliminating, in this case, the costs of applying an adhesive both for material and equipment as is done in attaching a preformed laminate. Use of the coating of the invention involves simply curtain coating, spraying, or any other previously mentioned means of applying the coating to a substrate such as gypsum board and then curing in an oven. In the case of a laminate, the laminate has to be first formed or cured to a film, then temporarily stored in a rolled up form, then unrolled for use (these procedures sometimes involving tensional distortions of sheet plastic). The next chronological procedure involves attaching the preformed sheet to the gypsum board, requiring additional material, handling and equipment. Other related advantages of using the liquid coating of the invention versus a preformed laminate on an application basis are: handling and storage, ease of change-over from one color to another, simple recoatability of rejects with the same coating, or building even heavier dry film thickness.

A cured film of the coating of the invention on gypsum board has similar cohesive, tensile and hand, appearance properties to vinyl laminate; a section can be cut from the board with a sharp knife and the removed section is found to be pliable and elastic. When cured on a paper covered (laminated paper) gypsum board, it improves the scuff and impact resistance properties over that of the attached uncoated paper and/or exceeds the physical properties of that same paper coated with hard, friable, non-elastic paint as cited above which also in some instances show increased gloss, as observed visually, with a minimum of applied abrasion such as would be encountered in stacking, shipping, or end use.

Another advantage of a liquid coating such as the coating of the invention is versatility in making dry films of various thicknesses from possibly three to six mils dry from one container of coating, versus a laminate, which may require storage of several thicknesses. If, during a run of boards through a curtain coater or spray, greater or lesser film (dry) thicknesses were desired on part of the run this could be easily done by controlling thickness of wet coating applied.

Compositionally, the coating of the invention is economically feasible both in raw material and manufacture and is basically formulated so that simple substitutions or replacements within compositional limitations imposed will produce or result in coatings essentially of the same order of end use performance of flexibility and cohesive, adhesive properties. Depending upon the particle size and types, levels of the dispersion resins used, different textures can be obtained. The coating of the invention may be applied in one or several coats using layers of the same or varying thicknesses. Typically, coating thicknesses may vary from about 1 to 10 mils (0.00245 – 0.0254 cm), although thicker coatings may be also employed if desired.

It is an object of this invention to provide novel processes and compositions for preparing a laminate having a textured decorative coating. A further object of the invention is to form such textured coating on a substrate in a single coating. Another object of the invention is to form decorative textured coatings on substrates such as fabric, paper, wood, gypsum board, particle board, cement-asbestos board, metal, or any flexible or rigid material which can be coated by conventional methods. Other objects of the invention will be apparent to those skilled in the art upon inspection of the following disclosure.

In accordance with certain of its aspects, this invention relates to novel compositions and to a process for preparing an article having a textured coating which comprises bonding to a substrate a self-adhering coating composition containing:

(a) 16.0 – 34.2 parts by weight of a first vinyl resin having a relative viscosity of 1.98 – 2.35; a molecular weight of about 75,000 – 101,000, and an average particle size of about 0.5 – 7.0 microns;

(b) 3.8 – 24.0 parts by weight of a second halogen-containing resin having a specific viscosity of about 0.50, an inherent viscosity of about 1.20, a molecular weight average of about 127,000, and a particle size range of at least 7.0 microns to 177 microns;

(c) 1.0 – 7.6 parts by weight of a third vinyl solution resin with reactive sites having a vinyl chloride content of 75.0 to 91.5 percent copolymerized with at least one member selected from the group consisting of vinyl acetate, vinylidene chloride, or an ester of maleic acid, and having an inherent viscosity of about 0.34 – 0.46;

(d) 0.2 – 3.8 parts by weight of a liquid epoxy resin having a viscosity of about 10,000 – 20,000 centipoises and an epoxy equivalent weight of about 180 – 220;

(e) 1.2 – 14.7 parts by weight of an aminoplast resin;

(f) 17 – 30.4 parts by weight of a plasticizer;

(g) about 0.0 – 15.3 parts by weight of a solvent-diluent which when present cooperates with plasticizers to dissolve the third vinyl resins (c), the liquid epoxy resin (d), and the aminoplast resin (e) but does not gel or dissolve either the first vinyl resin (a), or the second halogen-containing resin (b) at temperatures of about 20°–35°C.;

and wherein the first vinyl resin (a) and the second resin (b) are incompletely soluble in plasticizer (f) at temperatures of 20°–35°C. and wherein plasticizer (f) is capable of completely solubilizing the third vinyl resin solution (c);

(h) 3.0 – 23.7 parts by weight of pigments and/or fillers; and, optionally, (i) 1.6 – 2.5 parts by weight of at least one polyvinyl chloride stabilizer, wherein the total parts by weight of ingredients (a) – (i) amounts to 100 parts.

The first vinyl resin having a molecular weight of about 75,000 – 101,000 of this invention may include homopolymers and copolymers of vinyl chloride, vinylidene chloride, styrene, etc.; acrylonitrile-butadiene-styrene (ABS) polymers and copolymer acrylic type polymers characterized by polymers and copolymers of ethyl acrylate, butyl acrylate, and acrylonitrile, methyl methacrylate, acrylamide, etc.; polyolefin and/or related polymers, characterized by polymers and copolymers of ethylene, propylene, isoprene, butadiene, etc.; condensation polymers, such as polyesters characterized by polyethylene terephthalate, polyethers characterized by poly(propylene oxide), polyamides, polycarbonates, polyurethanes, epoxy resins, polyester styrene resins, etc. The polymeric materials may be copolymers of these compositions with other ethylenically unsaturated monomers. Ethylenically unsaturated monomers as used herein are compounds which contain polymerizable carbon-to-carbon double bonds and may include acrylates such as acrylic acid, ethyl acrylate, acrylonitrile, etc.; vinyls such as styrenes, vinyl acetate, etc. maleates such as maleic acid, maleic anhydride, maleate esters, etc.

Vinyl polymers containing no bound actate provide preferred first vinyl resins according to the invention. Examples of such commercially available homopolymeric resins include "Tenneco 1750" obtained from Tenneco Plastics Co. and "Exon 605" obtained from Firestone Plastics Co.

Another class of preferred first vinyl resins include copolymers of vinyl chloride and vinyl acetate having an acetate content of about 4.5 – 8.0 percent by weight based upon the total weight of the copolymer. Typical copolymers which may be used have a specific viscosity of about 0.40, an intrinsic viscosity of about 1.05, and an average particle size of about 0.5 – 7.0 microns. Examples of suitable commercial copolymers which may be used as first vinyl resins include "Marvinol 56" available from Uniroyal Company, "Tenneco 0565" available from Tenneco Company or "Exon XR–2327" obtained from Firestone Plastics Co.

Mixtures of high molecular weight vinyl resins may be used. For example, a mixture of methyl methacrylate and polyvinyl chloride may be used according to the practice of this invention. Typically, the molecular weight of the first vinyl resin is expressed in terms of viscosity and may have a relative viscosity of 1.98 – 2.35, usually about 2.00. The first vinyl resin is insoluble or only very sparingly soluble in the plasticizer and solvent-diluent at normal room temperatures and up to about 95°F. (35°C.) which is combined with the other ingredients to prepare the self-adhering coating composition used to prepare the textured coating of the invention. The first vinyl resin may be in solid or semi-flexible form having a particle size of about 0.5 – 7.0 microns, and preferably about 1.5 – 4.7 microns.

The second halogen-containing resin which may be used in the practice of this invention may be halogen-containing organic polymers, typically those which contain chlorine atoms bonded to the polymer chain. These polymers may be homopolymers including polyvinyl chloride-type polymers, e.g. polyvinyl chloride, polyvinylidene chloride, etc. They may also include copolymers formed by the copolymerization of vinyl chloride or vinylidene chloride with other ethylenically unsaturated monomers. Ethylenically unsaturated vinyl monomers include compounds which contain polymerizable carbon-to-carbon double bonds and may include acrylates such as acrylic acid, ethyl acrylate, acrylonitrile, etc.; vinyl monomers such as styrene, vinyl acetate, etc.; maleates such as maleic acid, maleic anhydride, maleate esters, etc. and polymers and copolymers thereof as defined supra.

The second resin is preferably a polyvinyl chloride resin having a specific viscosity of about 0.50, an inherent viscosity of about 1.22, and a particle size of at least about 7.0 to 177 microns. Preferably, particles having a size between about 7.0 – 177 microns may be used. Larger particles may be employed, but no particular advantages are obtained thereby.

The third more highly soluble vinyl resin polymers may include either so-called "tough" or "flexible" resin materials having reactive sites (usually carboxyl (—COOH) or hydroxyl (—OH) sites). The third vinyl resin with reactive sites and having increased solubility in volatile organic solvents, may have a preferred vinyl chloride content of 75 – 91.5 percent by weight copolymerized with at least one member selected from the group consisting of vinyl acetate, vinylidene chloride, or an ester of maleic acid, and having an inherent viscosity of about 0.34 – 0.46. The third vinyl resin containing reactive (cross-linking) sites in the molecule is preferably completely soluble in the plasticizer and in the solvent diluent of the invention.

The viscosity values employed herein are supplemental to or in lieu of molecular weight figures because the literature methods for determining polymer molecular weight have been found to vary widely as to procedure and reported molecular weight values. In place of molecular weights, the intrinsic viscosity of the vinyl resins of the invention are determined at 25°C. in cyclohexanone. The molecular weights of the resins are thus reported in terms of dilute solution viscosity values which are defined as follows:

(a) Relative viscosity $N_{rel} = V_1/V_2$
 wherein $V_1$ = Kinematic viscosity of the solution and
 $V_2$ = Kinematic viscosity of the solvent
(b) Specific Viscosity, $N_{sp} = 1/N_{rel}$
(c) Inherent viscosity, $N_{inh} = \ln N_{rel}/C$
 wherein $ln$ = Natural logarithm
 C = Sample weight in grams per 100 milliliters of solution
(d) Intrinsic Viscosity, $$[N] = \lim_{C \to 0} \frac{\ln N_{rel}}{C}$$

and:

$$[N] = \frac{\left(2.86 \ln \frac{V_1}{V_2}\right) + \left(\frac{V_1}{V_2} - 1\right)}{7.72 \times C}$$

Intrinsic viscosity is measured using a 0.3 percent by weight solution of resin in cyclohexanone at 25°C. using a Cannon-Fenske series 100 viscosimeter.

(e) Absolute viscosity is defined as the time of flow (in seconds) for a standard sample of a 2 percent by weight solution of the resin in orthochlorobenzene at 120°C. through a standard orifice.
(f) Molecular weights of resins may also be expressed in terms of K - values wherein K is defined by the following equations:
 (1) $\text{Log } N_{rel}/C = 75K^2 /1 + 1.5K + K$
 and
 (2) $K = 1000 k$ Molecular weights may be obtained using conversion charts based upon the foregoing information.

The epoxy resin component of the self-adhering coating composition of the invention may be any epoxy polymer formed by condensation of an epoxy compound (containing a

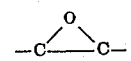

group) and a polyhydroxy compound (preferably a bis-aromatic polyhydroxide). The basecatalyzed, condensation product of epichlorohydrin and 2,2'-bis(hydroxyphenyl) propane (Bisphenol-A, prepared by the reaction of 2 moles of phenol and 1 mole of acetone) through the opening of the epoxide ring produces a suitable class of epoxy resins which may be used according to the invention herein. Particularly useful exposy resins are prepared according to the reaction:

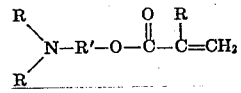

wherein each R is independently a hydrogen atom or a hydrocarbyl group of 1–12 carbon atoms and R' is a divalent group containing at least one carbon atom. When R is a hydrocarbyl (i.e. monovalent hydrocarbon) group, R is preferably an alkyl group of 1–12 carbon atoms (such as methyl, ethyl, n-propyl, i-propyl, n-butyl, isobutyl, tert-butyl, sec-butyl, pentyl, hexyl, n-heptyl, n-octyl, iso-octyl, nonyl, decyl, undecyl, and dodecyl), an aryl group of 6 – 12 carbon atoms (such as phenyl, phenethyl, tolyl, benzyl, naphthyl, xylyl, etc.), or an alicyclic group of 4 – 10 carbon atoms (such as cyclobutyl, cyclopentyl, cyclohexyl, 1,3-dimethylcyclohexyl, etc.). R' is preferably a divalent hydrocarbyl group such as the group $(CH_2)_n$ wherein $n$ is an integer 1–6;

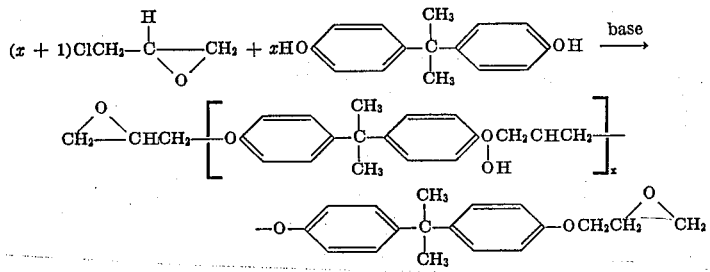

wherein $x$ represents the number of moles of Bisphenol-A which are combined with $x + 1$ mole of epichlorohydrin. The use of an excess of epichlorohydrin produces terminal epoxy groups and the molecular weight of the epoxy resin may vary from a thin liquid having a low average molecular weight to a viscous, thick, adhesive-type material or to a solid which may be especially useful in surface coatings wherein the average value of $x$ in reaction (I) may be at least 25. The linear polymer of reaction (I) may be modified by using other polyhydroxy compounds to replace all or part of the 2,2'-bis(hydroxyphenyl) propane. Other epoxides and mixtures thereof may be used in the reaction. For example, epoxides such as those obtained by expoxidation of unsaturated fatty acids may also be used. The epoxy resin polymers may be linear (as shown in reaction (I), above) or non-linear. Preferably, the epoxy resin component of the self-adhering coating composition of the invention herein may have a viscosity of about 10,000 – 20,000 centipoises and an epoxy equivalent weight of about 180 – 220.

The aminoplast resins which are employed in the novel self-adhering textured coating compositions of the invention may be prepared by vinyl polymerization (i.e. polymerization through an ethylenically unsaturated bond) of unsaturated monomers with an amine compound, usually employing a weight ratio of about 5 – 50 parts of amine compound per part by weight of unsaturated monomer. The amine resins may also be prepared by condensation of di- or tri-basic organic acids with diamines, hydroxyamines, or polyalkylenepolyamines. Another method of preparing amine resins which may be used in the self-adhering textured coating formulations of the invention is by reaction of an amine soap with an unsaturated monomer. Typical amine compounds which may be vinyl-copolymerized with an unsaturated monomer include the following:

(1) Amine-nitrogen containing esters of monofunctional unsaturated acids (2) Amine-nitrogen containing diesters of difunctional unsaturated acids such as maleic acid, fumaric acid, or itaconic acid esterified with an amine-nitrogen containing alcohol according to the reaction:

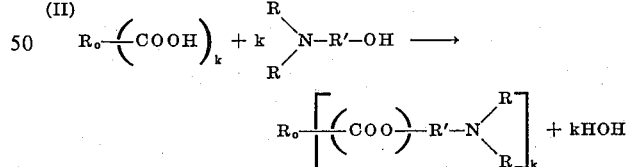

wherein $R_0$ is an organic group of 2 – 10 carbon atoms containing at least one olefinic unsaturation $$(-\overset{|}{C}=\overset{|}{C}-)$$

and having a valence $k$ equal to the number of carboxyl groups in the molecule and wherein R' and each R is independently as defined in (1);

(3) Quarternized amine-nitrogen containing unsaturated esters of types (1) and (2) above;

(4) Vinyl-containing amine-nitrogen heterocyclic compounds such as N-vinyl piperidine, N-vinyl pyridine, N-vinyl pyrrolidine, etc. and quaternized products thereof (such as N-vinyl pyrrolidinium chloride, N-vinyl pyrrolidinium bromide, N-vinyl pyrrolidinium fluoride, N-vinyl pyrrolidinium iodide, N-vinyl pyridinium chloride, N-vinyl pyridinium fluoride, N-vinyl pyridinium ionide, N-vinyl piperidinium chloride, N-vinyl piperidinium bromide, N-vinyl piperidinium fluoride, N-vinyl piperidinium iodide, etc.);

The amine-nitrogen containing components (1) – (4) may be homopolymerized to produce amine resins useful in the invention herein or may be preferably vinyl-copolymerized with unsaturated monomers or polymers. Typical unsaturated materials which may be combined with the amine-nitrogen components (1) – (4) to produce amine resins which may be used in the invention herein include isoprene, butadiene, ethylene, styrene, vinyl acetate, vinyl chloride, vinylidene chloride, acrylamide, methacrylamide (including N-alkyl derivatives of acrylamide and methacrylamide), unsaturated alcohols (including monoesters of diols with unsaturated acids such as hydroxypropyl acrylates, hydroxypropylmethacrylates, hydroxyethyl acrylates, and hydroxyethyl methacrylates). Vinyl copolymerization of such materials with the amine-nitrogen containing components (1) – (4) may be carried out directly or with a catalyst (optionally in the presence of a solvent or chain transfer agent) to produce an amine-containing resin for use in the novel self-adhering textured coating composition of the invention.

Other amine resins which may be used in the invention include polyesters, polyamides, polyureas, or polyurethanes wherein the polymer chain is terminated with amine groups. Commercially available urea-formaldehyde products such as "P – 138 – 60 Beckamine Solution" or "Uformite F–240" may be used. "P – 138 – 60 Beckamine Solution" is believed to contain a butylated urea-formaldehyde resin having about 38 – 42 percent by weight of volatile materials (xylol:-butanol in weight ratio of 1:1.5, respectively) with an acid number of 3 – 8.

The plasticizer employed in the invention may include a combination of monomeric and/or polymeric plasticizers such as dioctyl phthalate, diisodecyl phthalate diisononyl phthalate, or phosphate compounds (such as tricresyl phosphate, etc.), and chlorinated diphenyls or chlorinated polyphenyls. Dioctyl phthalate, diisononyl phthalate, and diisodecyl phthalate (including mixtures thereof) are preferred plasticizers and are employed according to the invention in amounts of from about 1 part by weight of plasticizer per 1 – 3 parts of either first vinyl resin (a) or second halogen containing resin (b) as herein defined.

The solvent-diluent of the invention possesses the ability to dissolve the third vinyl resin, the liquid expoxy resin, and the aminoplast resin whereas the first vinyl resin and the second halogen-containing resin are essentially insoluble in the solvent-diluent at temperatures of 20°–35°C. Ordinarily the added solvent-diluent comprises from 10 to 15 percent by weight of the total vinyl dispersion textured coating composition of the invention. Additional amounts of added (other than an aminoplast resin) solventdiluent may be employed if thinner coatings are to be applied and less solvent-diluent may be used to provide a thicker coating composition; on higher plasticizer levels, less solvent-diluent may be necessary to provide rheological properties.

In addition to the combination of a first vinyl resin, a second halogen-containing resin, a third vinyl resin, a liquid epoxy resin, an aminoplast resin, stabilizers, a plasticizer and a solvent diluent, the compositions of the invention may contain inert fillers, pigments, flatting agents, etc. By "inert" as used herein is meant any material which does not adversely interact with the compositions of the invention and which is compatible with the ingredients of the textured coating composition. Thus, an inert material may possess additional advantageous properties as long as the material is compatible with the coating composition of the invention herein. Pigments and/or fire-retardants such as titanium dioxide (rutile), antimony oxide, zinc phosphate, zinc borate, boric oxide, cadmium yellow, phthalocyanide blue, phthalocyanide green, cadmium red, quinacridone red, carbon black, iron oxides, aluminum oxides, etc. may be used. Flatting agents such as silica based powders, silica aerogels, etc. may also be used in the textured coating compositions of the invention.

A particularly useful embodiment of the invention contemplates the addition of flame retardant agents in amounts of up to about 50 – 60 percent by weight (preferably about 3 – 25 percent) based upon the total weight of the coating composition in the form in which the coating material is to be applied (i.e. either concentrated or diluted coating material, depending upon the method of application to be used). Antimony oxide (such as $Sb_2O_3$)s triorganoantimony compounds (such as triphenylantimony), also previously mentioned fire-retardant pigments, halogenated fire-retardant materials (especially polychlorinated organic compounds such as pentachlorophenol, etc.), as well as other compatible fire-retardant materials may be added to the coating compositions of the invention in order to obtain fire-retardant textured coatings.

Another advantage of the invention herein is that the coatings may be applied to materials such as gypsum board without the use of a primer and cured at temperatures below the calcining temperature of the gypsum board.

The textured coating compositions described herein may be applied to the article or substrate to be coated by spraying, curtain coating, roller coating, knife, dipping, flow, drawn-down, etc. or other coating method to produce a self-textured finish. For such applications, the concentrated coating composition is preferably reduced using a suitable solvent or dispersing medium (classified herein as a "reducer"). The concentration of the coating composition may be reduced by dilution of the coating material in a volume:volume ratio of about 2:1 – 10:1 (coating:reducer). For spray or curtain coating operations a coating:reducer volume ratio of about 10:3 is preferable, for reverse roller coating compositions a coating:reducer volume ratio of about 10:1 may be employed.

After the coating material is applied to the article or other substrate (either in concentrated or diluted form) the coating material may be heat cured either using a batch system or employing continuous conveyor-type heating units such as ovens maintaining surface temperatures of about 130°–185°C. for time periods sufficient to remove the more volatile diluents and solvents (if any) and to effect curing (i.e., plasticizer solution and cross-linking) of the novel coating compositions of the invention to form a textured coating on said article or substrate.

The reducer used according to the invention may be any combination of aromatic or aliphatic hydrocarbons, alcohols, glycol ethers (including glycol ether esters) and high molecular weight branched ketones. Reducers which are preferred include solvents and diluents which are slower to evaporate and are less volatile than, for example, benzene.

Typical examples of reducers which may be used include the following:

| DESCRIPTION OF REDUCER | AMOUNT (PARTS BY WEIGHT BASED UPON THE DILUTED COMPOSITION) |
|---|---|
| A. Hydrocarbons which may contain 0–25% by weight of aromatic hydrocarbons (benzene, xylenes, etc.) which have a K.B. value of 26–45 and a distillation range of about 154°C. – 204°C. | 200 – 300 |
| B. (a) Alcohols such as normal and secondary butanol, etc (b) Ketones such as di-isobutyl ketone, dimethyl ketone, etc. The alcohols or ketones may be each used alone or may be combined. | 240 – 300 |
| C. Ethylene glycol monoethyl ether acetate (Cellosolve acetate) | 350 – 455 |

Preferred reducers are prepared by combining about equal parts by weight of at least one solvent or diluent selected from each of the groups A, B, and C, supra. A particularly preferred class of reducers include reducers which contain n-butanol in combination with ethylene glycol monoethyl ether acetate, and an aromatic-containing hydrocarbon solvent-diluent.

The following examples are submitted for the purpose of illustration only and are not to be construed as limiting the scope of the invention in any way.

EXAMPLE 1

| INGREDIENT | AMOUNT (Parts by Weight) |
|---|---|
| (1) Di-isodecyl phthalate (f) | 17.45 |
| (2) Partially hydrolyzed vinyl chloride-vinyl acetate copolymer (VAGH type available from Union Carbide Corp.) (c) | 0.53 |
| (3) Maleic acid modified vinyl chloride copolymer (84% vinyl chloride, 15% vinyl acetate, 0.8% interpolymerized maleic acid); designated vinyl solution resin VMCH in powder form available from Union Carbide Corporation (c) | 0.53 |
| (4) Liquid epoxy resin (Epon 828, obtained from Shell Chemical Co.) (d) | 0.28 |
| (5) Aminoplast resin (butylated urea-formaldehyde type; Uformite F-240) obtained from Rohm & Haas Co. (e) | 1.25 |
| (6) Optional polyvinyl chloride heat and light stabilizers (2,4,6-tri-tertiary butyl phenol type) and organo-tin | 1.74 |
| (7) First vinyl resin; fine particles (a) Exon 605 - obtained from Firestone Plastics Co. | 21.81 |
| (8) Second halogen-containing resin; (b) (Marvinol VR 10, available from Naugatuck Chemicals) | 21.81 |
| (9) Titanium Oxide (pigment) | 3.08 |
| (10) Inert filler and extender ($CaCO_3$) | 16.68 |
| (11) Solvent-diluent (ether-ester type: Cellosolve acetate) | 4.95 |
| (12) Solvent-diluent (aromatic hydrocarbon: xylene) | 9.89 |
| TOTAL: | 100.0 |

GENERAL PROCEDURE

A sample of 100 parts by weight of plasticizer (f) [ingredient 1] was heated at a temperature of 82° – 94°C. and ingredients (2) and (3) [third vinyl resin (c)] were added and the mixture stirred until the added resins dissolved. The resulting solution was allowed to cool to room temperature and ingredients (4) [liquid epoxy resin (d)]; (5) [aminoplast resin (e)]; (6) [optional polyvinyl chloride stabilizer (i)]; (7) [first vinyl resin (a)]; (8) [second halogen-containing resin (b)]; (9) [optional pigment]; (10) [inert filler]; and the remainder (74.8 parts) of plasticizer (f) [ingredient 1] were added with mixing until completely dispersed. To the dispersed mixture was added one-half (24.75 parts) of solvent-diluent (g) [ingredient 11]; the mixture was blended thoroughly and one-half (49.45 parts) of solvent-diluent (g) [ingredient 12] was added followed by blending. The remaining portions of solvent-diluents [ingredients 11 and 12] were added in the given previous order and the final mixture blended thoroughly to give a self-adhering vinyl dispersion textured coating material.

Similarly, using the foregoing General Procedure, textured coatings were prepared using the ingredients and amounts as summarized in Table 1. In Table 1, capital letters refer to footnotes and lower case letters refer to the ingredients of the various coating compositions as set forth in the General Procedure, supra.

TABLE 1

| Comp. | Ingredient | | | | Amount, parts by weight | | | | Remarks | | | |
|---|---|---|---|---|---|---|---|---|---|---|---|---|
| | Example 2 | Example 3 | Example 4 | | Ex. 2 | Ex. 3 | Ex. 4 | Ex. 2 | Ex. 3 | Ex. 4 |
| a | Dispersion resin—Vinyl chloride homopolymer, rel. vis. 1.98-205, M.W. about 75×10³ micron part. size 3-7 (max.). | Copolymer vinyl resin, M.W. about 75×10³ micron particle size 1-2. | Homopolymer, M.W. about 77,000. Particle size 2-3 microns, relative viscosity 2.0. | | 21.8 | 17.4 | 19.2 | Exon 605 | Marvinol 57 | Tenneco 1750. |
| b | Dispersion resin—Polyvinyl chloride, specific viscosity 0.52, inherent viscosity 1.22, M.W. about 127×10³. | Homopolymer resin, 99.1% micron size 74-125 M.W. about 10.6×10³/(same as Example 2b) except sl. coarser particle. | Same as Example 2b | | 21.8 | 13.6/13.5 | 19.1 | Marvinol VR-11 | Rucon B41 (or Rucon B34)/Marvinol VR-10. | Marvinol UR-10. |
| c | Solution resins—Vinyl chloride-acetate copolymer; vinyl chloride:vinyl acetate (VMCH) 86.5:13.5 to 1% maleic VAGH=91.5% PVC and 3.5% PVA+(OH). | Same as Example 2c | Same as Example 2c | | 1.0 | 1.1 | 6.8 | VAGH, VMCH, equal parts by weight. | Same as Ex. 2c | Exon 470 Firestone. |
| d | Liquid epoxy resin with epoxy equiv. wt. 185-200 vis. (cp.)=11,000-14,000. | Same as Example 2d | Same as Example 2d | | 0.3 | 0.3 | 3.4 | ERL-2774 liquid epoxy. | Same as Ex. 2d | Epon 828. |
| e | Aminoplast resin—60% butylated urea | Same as Example 2e | Same as Example 2e | | 1.2 | 1.2 | 3.2 | Uformite F-240 | Same as Ex. 2e | Beckamine P196-60. |
| f | Plasticizers— D.I.D.P. (A) Chlorinated triphenyls (B) T.C.P. (C) | D.I.D.P. only | D.I.D.P. only | | A=10.3 B=3.6 C=3.5 | 17.3 | 23.0 | D.I.D.P. Avoclor 1254 T.C.P. | D.I.D.P. | D.I.D.P. |
| g | Combination of: low aromatic hydrocarbon diluent:Cellosolve acetate 1:2 by wt. | Same as Example 2g | Same as Example 2g | | 15.3 | 14.8 | 14.8 | Shell-Sol 72/Cellosolve acetate. | Same as Ex. 2g | Same as Ex. 2g. |
| h | Pigments, fillers— TiO₂ (D) SbO₃ (E) CaCO₃ (F) | TiO₂ (D) Talc (G) | TiO₂ (D) CaCO₃ (H) | | D=3.2 E=2.8 F=13.6 | D=3.1 G=2.0 F=14.6 | D=3.1 H=5.7 | Titanium dioxide Antimony oxide | TiO₂ talc CaCO₃ pigment (H) | Titanium dioxide. Coarse CaCO₃. |
| i | Optional types mixed stabilizers | Same as Example 2i | Same | | 1.6 | 1.7 | 1.7 | Organotin stabilizer | Same as Ex. 2 | Same as ex. 2. |
| Totals | | | | | 100.0 | 100.0 | 100.0 | | | |

NOTES.—D.I.D.P.=Di-isodecyl phthalate; T.C.P.=Tricresyl phosphate; PVA=polyvinyl acetate.

NOTE.—See the following table:

| | Chemical or brand name | Supplier |
|---|---|---|
| (F) | CaCO₃—Atomlite | Thompson Weinman & Co. |
| (G) | Talc | United Sierra Talc Co. |
| | Tenneco 1750 | Tenneco Chem. Inc. |
| | Epon 828 | Shell Chem. Co. |
| | Beckamine Solution P196-60 | Reichhold Chem. Co. |
| (H) | CaCO₃—629 Whitting | Thompson Weinman & Co. |
| (B) | Avoclor 1254 | Monsanto Chem. Co. |
| | Epoxy ERL 2774 | Union Carbide Co. |
| | Uformite F-240 | Rohm & Haas Co. |
| | Exon 605 | Firestone Plastics Inc. |
| | Marvinol 11, 57, 56 | Naugatuck Div., U.S. Rubber Co. |
| (A)(C) | Shell Sol | Shell Chem. Co. |
| | | Numerous Suppliers: Hooker Chem. Co.; Monsanto Chem. Co. |
| (D) | Titanium Dioxide | Dupont or Titanium Pigment Company. |
| (E) | Antimony Oxide | M&T Chemicals Inc. |

The novel coating compositions of the invention may be applied by various techniques to different substrates in order to produce articles having a textured coating surface, or several layers of the coating with or without other materials may be used. The textured coating compositions of the invention as described herein and particularly as set forth in Table 1 may be applied by the following General Method (which for convenience describes the application of textured vinyl coatings to panelboard, but which may be used for other substrates having various shapes and surface configurations such as paper overlay board, hardboard, plywood, gypsum board, particle board, ceramic surfaces, cement-asbestos board, metal-containing surfaces, metal articles including wire structures, rods, bars, cement blocks, etc.):

GENERAL METHOD OF APPLYING TEXTURED COATING COMPOSITION

Using a vinyl coating composition as described in Table 1, the liquid coating composition is applied to panelboard on a coating line using either spray or curtain coat application techniques. The board is preferably cleaned to remove particles, dust, dirt, etc. by passing the board through a rotary brush suction cleaner. Depending upon the substrate, other preliminary treatment may be desirable. For example, using paper covered gypsum board as the panelboard, the panelboard may be preheated in an infrared or convention oven to a surface or skin temperature of from ambient room temperature to about 120°–125°C. The heated panelboard may then be coated by either a spray of the liquid compositions of Table 1 or curtain coating. When applying the liquid coating compositions of the invention as set forth in Table 1 to panelboard, the viscosity of the liquid coating composition should range from about 8 to 15 seconds using a Number 5 Zahn Cup viscosimeter. Typical curtain coating apparatus which use a pressure head curtain coater (such as that employed in a Steineman apparatus) is preferred.

The wet film thickness applied by a typical curtain coater is regulated by adjustments of the blades of the curtain coater and by the velocity of the curtain coat conveyor. The normal application volume solids of the textured vinyl coating is 60 percent by volume and the dry film thickness which is subsequently obtained is ordinarily about 60 percent of the thickness of the wet film thickness originally applied.

If the novel coating compositions are applied by spray techniques, an airless spray using pumping equipment (such as Graco or Nordson) having a pumping ratio of greater than 28:1 is preferred, using a liquid coating composition having a viscosity of about 8–15 seconds as measured using a Number 5 Zahn Cup viscosimeter.

The coating may be cured using heat supplied by any convenient method. In general, the coating may be heated either by convection of by infrared heating. If convection heating is employed, the use of two successive zones is preferred. The air temperature of the first zone is preferably about 120°–125°C. with an air velocity of approximately 1220 meters per minute and a total residence time of 1–2 minute in the first zone. The air temperature of the second zone may be at least about twice that of the first zone (i.e. about 240°–250°C. and preferably about 288°–310°C.) using an air velocity of about 1835 meters per minute with a total residence time for each square meter of coated panelboard of about 1–2 minute. Similarly, if radiant heat is used to cure or bake the liquid coated panelboard dwell times of the liquid coated panelboard range from 2–3 minutes. The surface temperature of the coating at the exit end of the curing oven is preferably about 135°–220°C. regardless of the particular heating arrangement or heat source which is used.

A suitable cooling zone may also be provided to allow the surface temperature of the panelboard which now has a textured vinyl coating to be reduced to about 79°–80°C. before stacking or contact with solid articles. The completed panelboard contains a tough, resilient coherent continuous textured vinyl surface which is unexpectedly superior to conventional coatings applied by painting, spraying, roller application in one or more properties such as: adhesion (peel test); scratch adhesion (Gardner Scratch adhesion tester); moisture resistance (as measured by humidity resistance, steam vapor bond resistance, and continuous exposure to hot water at 93.5°C. for 24 hours); light stability (resistance to pigment fadeout after exposure for 1000 hours in a standard Fadeometer); stain resistance (using one hour contact times with materials such as 10 percent nitric acid, 10% sulfuric acid, 10 percent sodium hydroxide; cola beverages, canned spinach, hot bacon grease etc. followed by cleaning with soap and water and/or standard household abrasive cleaners to determine permanence of stain); abrasion resistance (determined on a Tabor Abraser measured after 100 cycles with a 1000 gram load and a CS-17 wheel and without loss of texture using 500 cycles, a CS-17 wheel and a 500 gram load); and crocking resistance (AATCC Standard Test No. 8–52).

EXAMPLE 5

Using the liquid coating composition of Example 1 a series of gypsum board panelboards were curtain coated as described in the foregoing General Method of applying textured coating compositions using a two-zone convection oven under process conditions as described below.

Gypsum board panelboards having a uniform thickness and a size of 2 × 9 feet (0.61 × 2.75 meter) were used. The preheat oven was set at 121°C. The conveyor speed was set at 13.7 meters per minute. The surface temperature of the liquid coated gypsum board coming out of the preheat oven was 57.2°C. The temperature just prior to the curtain coat was 37.8° – 43.3°C. The velocity of the curtain coat conveyor was about 39.1 meters per minute. The first heating zone was maintained at about 177°C.; the second heating zone was maintained at about 305°C. Surface temperature at the exit end of the heating oven was measured with a radiant optical pyrometer placed about 25.4 centimeters from the exit of the oven and had a reading of about 118°C. The combined, residence time in zone one and zone two was 2 minutes and 53 seconds. After cooling and just prior to stacking the textured vinyl coated gypsum boards had a surface temperature of about 65.5°C. The texture appeared fairly good with faint change of coloration. Adhesion was excellent over the general areas coated.

Comparisons using textured vinyl coated gypsum boards having dry coating thickness of 0.0076 cm and 0.0154 cm. were compared with vinyl acetate acrylic spray coatings, double coats of latex flat wall paint (roller applied), two coats of alkyd flat wall paint (roller applied) and single coat polyvinyl acetate primer coated with one coat of gloss enamel (roller applied) measuring properties such as comparative toughness and scratch resistance (Gardner), Tabor Abrasion, impact resistance, peel test, crocking, sulfide stain, moisture resistance, light stability and stain resistance. The overall comparisons showed that the texured vinyl coatings of the invention were superior in one or more of all of the above properties when compared with coatings applied by other methods having dry thicknesses of from 0.0116 cm to 0.0259 cm.

Although this invention has been illustrated by reference to specific embodiments, modifications thereof which are clearly within the scope of the invention will be apparent to those skilled in the art.

We claim:

1. An article having a textured self-adhering coating bonded to a substrate, said self-adhering coating composition containing:
   a. 16.0 – 34.2 parts by weight of a first vinyl resin having a relative viscosity of 1.98 – 2.35; a molecular weight of about 75,000 – 101,000, and an average particle size of about 0.5 – 7.0 microns;
   b. 3.8 – 24.0 parts by weight of a second halogen-containing resin having a specific viscosity of about 0.50, an inherent viscosity of about 1.20, a molecular weight average of about 127,000, and a particle size of at least 7.0 microns to 177 microns;
   c. 1.0 – 7.6 parts by weight of a vinyl solution resin with reactive sites having a vinyl chloride content of 75.0 to 91.5 percent copolymerized with at least one member selected from the group consisting of vinyl acetate, vinylidene chloride, or an ester of maleic acid, and having an inherent viscosity of about 0.34 – 0.46;
   d. 0.2 – 3.8 parts by weight of a liquid epoxy resin having a viscosity of about 10,000 – 20,000 centipoises and an epoxy equivalent weight of about 180 – 220;
   e. 1.2 – 14.7 parts by weight of an aminoplast resin;
   f. 17 – 30.4 parts by weight of a plasticizer;
   g. about 0.0 – 15.3 parts by weight of a solvent-diluent which when present cooperates with plasticizers to dissolve the third vinyl resins (c), the liquid epoxy resin (d), and the aminoplast resin (e) but does not gel or dissolve either the first vinyl resin (a), or the second halogen-containing resin (b) at temperatures of about 20°– 35°C.; and wherein the first vinyl resin (a) and the second resin (b) are incompletely soluble in plasticizer (f) at temperatures of 20°–35°C. and wherein plasticizer (f) is capable of completely solubilizing the third vinyl resin solution (c);
   h. 3.0 – 23.7 parts by weight of pigments and/or fillers; and optionally,
   i. 1.6 – 2.5 parts by weight of at least one polyvinyl chloride stabilizer, wherein the total parts by weight of ingredients (a) – (i) amounts to 100 parts.

2. An article as claimed in claim 1 having a textured coating wherein the substrate is paper overlay board.

3. An article as claimed in claim 1 having a textured coating wherein the substrate is hardboard.

4. An article as claimed in claim 1 having a textured coating wherein the substrate is plywood.

5. An article as claimed in claim 1 having a textured coating wherein the substrate is gypsum board.

6. An article as claimed in claim 1 having a textured coating wherein the substrate is particle board.

7. An article as claimed in claim 1 having a textured coating wherein the substrate is cement-asbestos board.

8. An article as claimed in claim 1 having a textured coating wherein at least a portion of a substrate is metallic.

* * * * *